United States Patent Office 3,264,209
Patented August 2, 1966

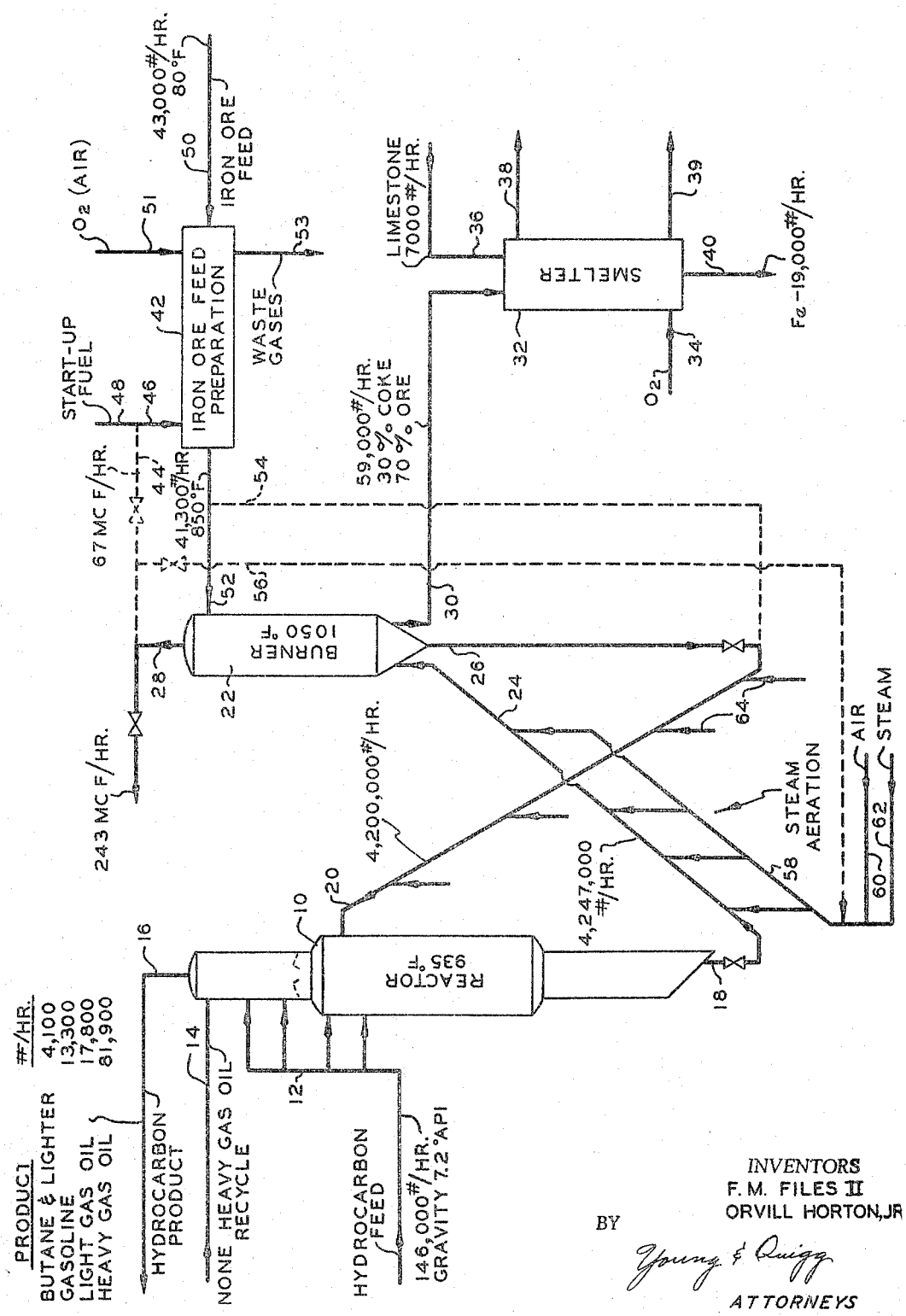

3,264,209
SIMULTANEOUSLY COKING IRON ORE AND CRACKING HYDROCARBONS
Francis M. Files II and Orvill Horton, Jr., Bartlesville, Okla., assignors to Phillips Petroleum Company, a corporation of Delaware
Filed Oct. 22, 1962, Ser. No. 232,008
4 Claims. (Cl. 208—124)

This invention relates to a process and apparatus for simultaneously producing coked iron ore suitable for reduction to iron and cracked hydrocarbons utilizing a fluid catalytic cracking unit.

The partial coking of iron ore in contact with hydrocarbons undergoing cracking has been practiced in the art. This invention is concerned with an improved process of this type which provides a better supply of coke on the iron ore and effects substantial reduction of the ore preparatory to passing the same to a reduction furnace.

Accordingly, it is an object of the invention to provide a novel process for simultaneously cracking hydrocarbons and producing partially reduced and coked iron ore as a feed to a reducing furnace. Another object is to provide a catalytic cracking process which produces partially reduced and heavily coked iron ore particles in condition for reduction in an iron smelter. A further object is to provide a hydrocarbon cracking and coking process utilizing iron ore as a catalyst which when applied to a hydrocarbon feed of high sulphur content reduces the sulphur from both the hydrocarbon product and the coked ore. Other objects of the invention will become apparent to one skilled in the art upon consideration of the accompanying disclosure.

A broad aspect of the invention comprises subjecting a hydrocarbon feed to cracking in a cracking zone in contact with a fluidized bed of fine particulate iron ore so as to deposit coke on the ore and crack and upgrade the hydrocarbon feed; recovering the upgraded hydrocarbon; transferring coked iron ore from the cracking zone to a fluidized bed of ore in a regeneration zone and burning off a portion of the coke from the iron ore therein in contact with $O_2$-containing gas thereby forming an intimate mixture of coke and partially reduced iron ore; passing a portion of the partially reduced iron ore to the cracking zone as catalyst; and recovering a remaining portion of the partially reduced and coked iron ore as a feed for a reducing furnace. Further aspects of the invention comprise passing off-gas from the regenerator into contact with the iron ore prior to its introduction into the regenerator, passing off-gas from the regenerator into the stream of coked catalyst passing from the reactor to the regenerator so as to increase the reducing gases in the regenerator, and passing a portion of the iron ore feed to the cracking unit directly into the reactor with or without pretreatment of the iron ore in contact with off-gas.

A more complete understanding of the invention may be had by reference to the accompanying flow sheet which shows a preferred arrangement of apparatus and flow for effecting the invention.

Referring to the drawing, a reactor or catalytic cracker 10 is provided with feed inlet conduit means 12, heavy gas oil recycle 14, hydrocarbon product effluent line 16, catalyst take-off line 18 and catalyst inlet line 20.

The burner or regenerator 22 is connected with catalyst take-off line 18 through conduit 24 and with catalyst feed line 20 by means of regenerator leg 26. The regenerator is provided with an off-gas line 28 and withdrawal line 30 for withdrawal of a portion of the coked iron ore in partially reduced condition for passage to a smelter or other type of reduction furnace illustrated by smelter 32.

The smelter has an oxygen or air inlet line 34, and inlet line 36 for limestone, and off gas line 38 and a withdrawal line 40 for molten iron. Slag is withdrawn thru line 39.

Numeral 42 designates an iron ore feed preparation means including comminuting equipment for reducing the particle size of the iron ore for use in a fluid catalytic cracking unit, such as 100 to 300 mesh size. Apparatus 42 may also include contacting equipment for pretreating the comminuted ore with off-gas from the regenerator received through lines 44 and 46, or extraneous gas from line 48. The raw iron ore as mined is fed into unit 42 from line 50 and the comminuted ore, either treated or untreated, is passed through line 52. Line 51 provides $O_2$ (air) and waste gases vent thru line 53.

Transfer line 54 connects with the source of comminuted and pretreated ore through line 52 or directly with unit 42 and with line 20 for direct introduction of catalyst (ore) to the reactor without first passing the ore through the regenerator. Line 56 connects with off-gas line 28 thru line 44 and with line 58 for injecting off-gas along with air from line 60 and steam from line 62 into transfer line 24. Lines 64 connect with catalyst inlet line 20 for injecting fluidizing gas such as steam into the catalyst line.

Catalytic reactor 10 is operated in conventional manner as a fluid catalytic cracker, with heat required for the reaction being supplied in the preheated hydrocarbon feed and in the injected catalyst which is heated to about reaction temperature in regenerator 22. Injecting a portion of the iron ore catalyst directly to the reactor permits more accurate control of the amount of coke deposited on the iron ore and also good temperature control within the reaction zone. Substantially all of the iron ore catalyst can be introduced in this manner by pretreating the catalyst with regenerator off-gas. Lesser amounts can be injected directly without pretreatment and preheating by utilizing sufficiently high regeneration temperature to provide hot catalyst in line 26.

The feature of pretreating the comminuted iron ore with off-gas from the regenerator improves the efficiency of the overall operation in several respects. First, the reducing nature of the off-gases effects some reduction of the ore so as to permit greater reduction in the cracking unit (including the regenerator). Secondly, the heat content (latent and combustion) of the off-gases partially removes the organic and volatile matter from the ore and reduces the heat requirement thereof as it enters the cracking system. Thus a smaller amount of coke is burned in the regenerator of the cracking unit in order to maintain the necessary operating temperatures.

Overall, the process and apparatus of the invention provide the following benefits: (1) Higher yield of coke from the hydrocarbon charge; (2) Removal of sulphur from both the liquid product (hydrocarbon) and the coke when high sulphur content oils are charged; (3) More efficient pretreatment of the iron ore by removal of the major portion of the volatile matter and the organic matter, by partially reducing the ore, by depositing sufficient coke on the ore for complete reduction in any subsequent reducing furnace treatment, and by reducing the amount of coke required for final reduction because of the close association of the coke and the iron ore effected by the process.

The partially reduced and coked iron ore particles may be reduced in any type of reducing furnace. The type of reducing furnace utilized is not a part of this invention.

The following is a discussion of the various steps of the operation of simultaneous coke production, pre-treating iron ore, and hydrocarbon cracking.

*Step 1.*—The as-received iron ore is charged to the pre-preparation area where the following operations are performed:

(A) The iron ore is crushed and/or ground so that the major portion of its particle size on being discharged from the following described step can be readily handled in the solids handling system of the cracking unit.

(B) The iron ore is then charged at its as-received temperature to a kiln or other mechanical contacting means where it is contacted with hot combustion gases. These gases are generated by burning the effluent gases from the burner (regenerator) of the cracking unit. Additional fuel may be used if the volume of the above-mentioned gases is insufficient to heat the iron ore to the desired temperature. The combustion air supplied to the burners is maintained at a minimum so that the resulting combustion gases are reducing in nature. The purpose of this step is to remove moisture and organic matter from the ore by directly contacting it with hot combustion gases thus heating it to an average temperature in the range of 750–850° F. Some reduction of the ore may also occur.

(C) The iron ore is then screened to remove particles that are too large to be handled in the solids handling system of the cracking unit. The large particles may be those that were too large from the crushing and/or grinding operation or agglomerates formed in the previously described operation. The large sized particles are returned to the crushing operation and the smaller size are charged to the cracking unit as hereinafter described.

If desired, Step B as outlined above may be omitted. In this case, the off gases from the burner are used for other fuel purposes or wasted, and the iron ore is charged to the cracking unit at its as-received temperature.

*Step 2.*—Cracking unit operations:

(A) The ore is then charged continuously to the burner, transfer line to the burner, or transfer line from the burner to the reactor, or divided as described between these charge points in order to optimize operating conditions and meet product requirements.

(B) The ore is continuously circulated by the solids handling system through the reactor and the burner of the cracking unit. The oil to be processed is charged continuously to the reactor. The ore is heated in the burner by burning a portion of the coke (carbon) that has been previously deposited on ore particles as well as free coke particles coming from the reactor. It is then circulated to the reactor where it contacts the oil to be processed and furnishes heat to maintain the required heat balance for the cracking reaction. In the reactor, coke is deposited on the iron ore as well as forming separate coke particles. The coke and coke-ore particles are circulated to the burner where a portion of the coke is burned as previously described. Coke and coke-ore particles are withdrawn from the burner on a continuous basis. The iron ore is partially reduced in the reactor and burner due to the reducing atmosphere and temperature existing in these pieces of equipment. The sulfur content of the hydrocarbon stream is also reduced. Operating temperatures and pressures, charge rates of oil and ore, and the circulating rate and burning of the ore-coke and coke particles are controlled to give (1) the desired ratio of coke to ore in the withdrawal stream of the burner, and (2) to give the desired product from cracking the hydrocarbon. This ratio will normally be in the range of 0.3 to 0.6 lb. of coke per lb. of ore. The operating conditions will vary with the type of hydrocarbon charged and the type of products desired. They will normally be within the following ranges:

| | |
|---|---|
| Reactor temperature, ° F. | 900–1000 |
| Reactor pressure, p.s.i.g. | 5–20 |
| Burner temperature, ° F. | 1000–1200 |
| Burner pressure, p.s.i.g. | 10–30 |

(C) Hydrocarbons in gaseous form are withdrawn from the reactor on a continuous basis.

(D) In order to better control the composition of the hydrocarbon products it may be desirable to recirculate heavy gas oil to the reactor from the hydrocarbon separation operation as described in Step 4.

*Step 3.*—The mixture of coke and ore withdrawn from the burner described in Step 2 is charged to the final ore reduction furnace. The proper amount of limestone and other chemicals are added as required to reduce the ore to pig iron. The final reduction furnace may be any of the conventional types such as blast, electric, etc. It may be necessary to form the coke-ore mixture into pellets or briquettes that have sufficient strength to support the weight of the bed in the reduction furnace. It may be necessary to use a binding agent in the pelletizing or briquetting operation.

*Step 4.*—The gaseous hydrocarbons withdrawn from the reactor are purified and separated by conventional means for commercial uses.

It may be advantageous when operating under some conditions, particularly with high carbon lay-down, to pass a substantial portion of the iron ore to the reducing furnace after a once-thru operation, i.e., once thru the reactor and from the reactor directly to the furnace.

Operating conditions illustrating one mode of performing the invention are set forth on the drawing. It should be noted that 19,100 #/hr. of pig iron along with 117,100 #/hr. of upgraded hydrocarbons are produced.

Certain modifications of the invention will become apparent to those skilled in the art and the illustrative details disclosed are not to be construed as imposing unnecessary limitations on the invention.

We claim:

1. A process for simultaneously upgrading hydrocarbons, producing coke, and coking iron ore which comprises the steps of:
   (1) comminuting said iron ore to a particle size suitable for fluidizing with a gas;
   (2) passing comminuted ore from step (1) to at least one of a fluidized-bed hydrocarbon cracking zone and a fluidized bed burning zone;
   (3) passing separate streams of heavy, coke-forming hydrocarbon oil and hot iron ore into said cracking zone and contacting said oil and iron ore therein under cracking and coking conditions including a temperature in the range of 900 to 1000° F. so as to crack said oil and lay down coke on said iron ore;
   (4) recovering cracked hydrocarbons from step (3) as a product;
   (5) passing coke-ore from step (3) to the burning zone of step (2) and burning a portion of the coke therefrom with $O_2$-containing gas to raise the temperature of said ore to the range of 1000 to 1200° F. and substantially above said cracking temperature and to partially reduce same;
   (6) passing a portion of the hot ore from step (5) to step (3) to maintain said cracking temperature and catalyze the cracking reaction;
   (7) contacting ore from step (1) with a substantial portion of the hot off-gas from step (5) to substantially preheat same prior to step (2); and
   (8) passing a portion of the coked and partially reduced ore from step (5) to an ore reduction furnace to produce pig iron.

2. The process of claim 1 including the step of using a portion of the hot off-gas from step (5) as transport gas in transferring said coked iron ore to step (3), thereby increasing the concentration of reducing gases in the burning zone and the degree of reduction of iron ore therein.

3. The process of claim 1 including the step of passing a portion of said iron ore directly to said cracking zone before passing same through said burning zone.

4. The process of claim 1 wherein operating temperatures in said cracking and burning zones, charge rates of oil and ore, and circulating rate and burning rate of ore-coke particles are controlled to produce a weight ratio of coke to ore of 0.3 to 0.6.

References Cited by the Examiner

UNITED STATES PATENTS

| | | | |
|---|---|---|---|
| 2,288,613 | 7/1942 | Dill | 208—121 |
| 2,307,997 | 1/1943 | Dill | 75—26 |
| 2,417,949 | 3/1947 | Riveroll | 75—34 |
| 2,488,030 | 11/1949 | Scheineman | 208—164 |
| 2,499,255 | 2/1950 | Parker | 208—124 |
| 2,781,234 | 2/1957 | Boisture et al. | 208—164 |
| 3,012,962 | 12/1961 | Dygert | 208—164 |
| 3,028,331 | 4/1962 | Tucker | 208—165 |
| 3,097,156 | 7/1963 | Johnson et al. | 208—124 |

DELBERT E. GANTZ, *Primary Examiner.*

ALPHONSO D. SULLIVAN, *Examiner.*

P. P. GARVIN, H. LEVINE, *Assistant Examiners*